United States Patent
Bitzer

(10) Patent No.: US 8,651,256 B2
(45) Date of Patent: Feb. 18, 2014

(54) METHOD AND ARRANGEMENT FOR DETERMINING THE WEAR CONDITION OF A SHIFTING CLUTCH

(75) Inventor: Franz Bitzer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 668 days.

(21) Appl. No.: 12/604,547

(22) Filed: Oct. 23, 2009

(65) Prior Publication Data

US 2010/0108461 A1 May 6, 2010

(30) Foreign Application Priority Data

Nov. 5, 2008 (DE) .......................... 10 2008 043 492

(51) Int. Cl.
*F16D 66/02* (2006.01)

(52) U.S. Cl.
USPC ...................................... 192/30 W; 701/30.8

(58) Field of Classification Search
None
See application file for complete search history.

(56) References Cited

U.S. PATENT DOCUMENTS

| | | | | |
|---|---|---|---|---|
| 4,629,045 A | * | 12/1986 | Kasai et al. ...................... | 477/86 |
| 4,646,891 A | * | 3/1987 | Braun ............................ | 477/175 |
| 4,899,858 A | * | 2/1990 | Cote et al. ....................... | 477/83 |
| 5,029,678 A | * | 7/1991 | Koshizawa ....................... | 192/76 |
| 5,337,874 A | * | 8/1994 | Oltean et al. ............. | 192/70.252 |
| 5,632,365 A | | 5/1997 | Maucher | |
| 6,085,882 A | * | 7/2000 | Kimmig et al. ............ | 192/70.18 |
| 6,161,670 A | | 12/2000 | Doremus et al. | |
| 6,202,818 B1 | * | 3/2001 | Maucher .................. | 192/70.252 |
| 6,405,846 B1 | * | 6/2002 | Reik et al. ............... | 192/70.252 |
| 6,431,338 B1 | * | 8/2002 | Naito et al. .............. | 192/70.252 |
| 6,883,658 B2 | * | 4/2005 | Reul et al. ........................ | 192/98 |
| 2004/0040816 A1 | * | 3/2004 | Reul et al. ................ | 192/85 CA |
| 2004/0256194 A1 | * | 12/2004 | Berger Gunnerud et al. .. | 192/85 CA |

FOREIGN PATENT DOCUMENTS

| | | |
|---|---|---|
| DE | 30 43 348 A1 | 7/1982 |
| DE | 195 10 905 A1 | 10/1995 |
| DE | 698 08 414 T2 | 6/2003 |
| DE | 20 2005 021 024 U1 | 1/2007 |
| DE | 10 2007 027 478 A1 | 1/2008 |
| DE | 10 2007 044037 A1 | 8/2008 |
| DE | 10 2007 026 770 A1 | 12/2008 |
| DE | 10 2007 026770 A1 | 12/2008 |
| FR | 2 854 216 A | 10/2004 |
| JP | 2007 040452 A | 2/2007 |
| WO | 2008/151923 A1 | 12/2008 |

* cited by examiner

*Primary Examiner* — David D Le
*Assistant Examiner* — Ryan Dodd
(74) *Attorney, Agent, or Firm* — Davis & Bujold, PLLC; Michael J. Bujold

(57) ABSTRACT

A method of determining the wear condition of a shifting clutch (1) of a motor vehicle which is provided either for interrupting the force flow or equalizing the rotation speed between a drive output shaft (2) of an internal combustion engine (3) and a drivetrain (4). The wear condition of the clutch (1) is determined from the parameters of clutch release path ($s_{ausrück}$) the and release force ($F_{ausrück}$), at a release bearing (5) of the clutch (1) and, for this purpose, a difference between the clutch release path ($s_{ausrück}$), at a first increase-point (11; 12) of the release force ($F_{ausrück}$) and at a reference point (13) represented by a second increase of the release force ($F_{ausrück}$), is measured when the clutch is actuated.

11 Claims, 1 Drawing Sheet

METHOD AND ARRANGEMENT FOR DETERMINING THE WEAR CONDITION OF A SHIFTING CLUTCH

This application claims priority from German patent application serial no. 10 2008 043 492.2 filed Nov. 5, 2008.

FIELD OF THE INVENTION

The invention concerns a method and arrangement for determining the wear condition of a shifting clutch of a motor vehicle, which is provided for interrupting the force flow or assimilating the rotation speed between a drive output shaft of an internal combustion engine and a drivetrain of the motor vehicle.

BACKGROUND OF THE INVENTION

In motor vehicles a clutch is usually provided between a drive output shaft of the internal combustion engine and the drivetrain, in order to build up or interrupt the force flow from the internal combustion engine without jerkiness during the starting process. In a motor vehicle with a manual shift transmission, for shifting it is necessary to have very rapid and complete interruption of the force flow and the lowest possible mass moments of inertia. These requirements are fulfilled by a shiftable, dry friction clutch consisting of a diaphragm spring pressure plate connected to the driveshaft of the internal combustion engine, a clutch disk that can move axially on the input shaft of the transmission downstream and a disengagement device which, via a release bearing, transfers the release path from the non co-rotating actuation elements of the shifting clutch to the pressure plate. In the non-actuated condition of the shifting clutch the pressure plate is pressed by the diaphragm spring against the clutch plate, producing a frictional connection between the two plates so that both these elements rotate at the same speed. When the shifting clutch is actuated, the disengagement device acts upon the release bearing and presses the diaphragm spring in the direction of the pressure plate. This releases the pressure of the diaphragm spring from the pressure plate and results in disengaging the shifting clutch. Between the fully engaged and fully disengaged positions of the clutch the speed is controlled by the action of one side of the clutch on the other side of the clutch as a function of the pressure force of the diaphragm spring on the pressure plate and, correspondingly, that of the pressure plate against the clutch disk, so that the shifting clutch is acting as a speed converter. In such cases the torque is transmitted unchanged, but during speed conversion the torque transfer takes place with slipping, which leads to heating of the clutch and wear of its lining.

Unless excessive clutch wear is recognized in good time, the motor vehicle may be immobilized since transmission of the force flow from the combustion engine to the drivetrain is no longer possible. For that reason, to an increasing extent clutch wear indicators are provided, by means of which the wear condition of the shifting clutch can be monitored. This enables wear of the shifting clutch to be recognized at an early stage, so that the clutch can be replaced the next time that the motor vehicle is taken to a workshop.

From DE 20 2005 021 024 U1 a shifting clutch for the drivetrain of a motor vehicle is known, in which signal-emitting or signal-generating elements and a sensing element are provided, such that the wear condition of the shifting clutch can be determined from the separation of the signals received by the sensing element. For this purpose one of the signal-emitting elements is arranged on the pressure plate of the shifting clutch, while the respective other signal element is fixed on the housing of the clutch. When the drivetrain is in operation both signal elements sweep across the sensing element. The time separation of the signals then allows a conclusion to be drawn about the position of the pressure plate relative to the housing, and from this the wear can be estimated.

To those familiar with the subject other clutch wear recognition means are known, in which the clutch loading is calculated and the clutch lining wear is estimated on the basis of the loads. Furthermore, there are wear recognition methods that are based on clutch position, which determine the condition of the clutch by comparing the engaged position of the clutch when new, to the current engaged position.

The above methods of the prior art have the disadvantage that the clutch wear cannot be determined as an absolute value. For example, if the control unit is replaced the clutch wear values already determined are lost unless they have been transferred to the newly fitted control unit. Since the process of transferring clutch wear values already recorded into a new control unit can only be controlled with much difficulty in practice, during further operation of the motor vehicle concerned the wear calculations may be wrong and this can lead to replacement of the clutch for no reason, or to immobilization of the vehicle because the clutch has not been replaced in time.

SUMMARY OF THE INVENTION

Accordingly, the purpose of the present invention is to provide a method and a device for determining the wear condition of a shifting clutch of a motor vehicle, which enable an absolute determination of the wear of the clutch.

The invention makes use of the technical principle that the wear condition of the shifting clutch can be determined from the parameters of clutch release path and release force in a release bearing of the shifting clutch, and for this purpose a difference between the clutch release path at a first increase of the release force and a reference point represented by a second release force increase during clutch actuation is measured. In this case, to determine the parameter at least one sensor is provided in the area of the release bearing, which in turn is connected to a device for evaluating the parameter it has detected. In the case of a new shifting clutch the difference between the clutch release paths at a first release force increase and at the second increase that represents the reference point has a certain value, which increases progressively with increasing wear. Since both the clutch release path at a first increase of the release force and the release path at the second increase can continually be freshly determined by sensors which detect the parameters of the clutch release path and release force at the release bearing, the wear of the shifting clutch can correspondingly be determined as an absolute value at any time. Consequently, a replacement of the control unit or inaccuracies regarding the fitting position of the clutch are insignificance. In addition, there is no need for additional signaling or scanning elements in the area of the clutch disk or pressure plate.

In a further development of the invention, if there is no reference value and/or after a defined time period, a measurement is made and the current reference value is then stored. This makes it unnecessary to measure the reference value each time the wear condition of the clutch is determined, so that the quantity of data to be processed by the evaluation unit can be kept small. If there is no reference value because the evaluation unit has been replaced, or to equalize the reference value recorded in the evaluation unit, then a new measurement can be made at defined time intervals or in particular situations. By determining the reference value at intervals, calibration errors of the path and force sensors can consequently also be compensated for.

In one embodiment of the invention the wear condition is measured when the internal combustion engine is started and the shifting clutch is first actuated. This has the advantage that when the motor vehicle is first operated a condition check of the clutch is carried out and consequently a possible failure of the clutch due to excessive wear can be determined before driving begins.

In a further development of the invention, if at least one defined limit of the difference is exceeded a warning is emitted to the driver of the vehicle. This informs the driver that the defined warning threshold has been exceeded, so that he can react to the situation appropriately and plan to make his way to a workshop.

According to another, advantageous version of the invention, when a first limit has been exceeded a warning message of moderate urgency is emitted to the driver of the vehicle, whereas when a second limit is exceeded a warning message of greater urgency is produced. By virtue of such grading of the urgencies the driver of the vehicle can be alerted already very early to the wear condition of the shifting clutch, so that replacement of the clutch can be planned for the next inspection of the motor vehicle at a workshop.

In a further development of the invention, the release force at the release bearing is determined by a pressure and/or force sensor. This enables the release force parameter to be determined reliably. Besides, in some circumstances a sensor already present in the area of the clutch can be used.

In accordance with a further embodiment of the invention the release force can also be calculated. For this, as an example, a known valve control signal in a control unit of the motor vehicle can be used. By means of the valve control signal a corresponding valve for actuating a hydraulic or pneumatic release device is activated, and as a function of the duration of the valve's activation and taking into account certain physical boundary conditions such as piston diameter, valve cross-section, volume flow or density, under- or over-critical pressure ratio, supply pressure and ambient pressure, the clutch release force can be calculated on the basis of the known physical relationships.

In accordance with an advantageous embodiment of the invention, the release force is determined by measuring a pressure of a hydraulic or pneumatic release device. This measure allows the method according to the invention to be also used in the case of shifting clutches with hydraulic or pneumatic release devices. To those familiar with the field, however, it will be clear that depending on the structure of the release device, other ways to determine the release force can be used as well.

Advantageously, the device for evaluating the parameters determined is made in the manner of a control unit. Correspondingly, the said parameters can be evaluated and the wear condition of the clutch accordingly determined centrally in a control unit of the motor vehicle and consequently, depending on the condition determined, an appropriate reaction can also be initiated from that central location.

BRIEF DESCRIPTION OF THE DRAWINGS

Below, further invention-improving measures are indicated in more detail together with the description of a preferred example embodiment of the invention with reference to the figures, which show.

DETAILED DESCRIPTION OF THE PREFERRED EMBODIMENTS

Figure 1:
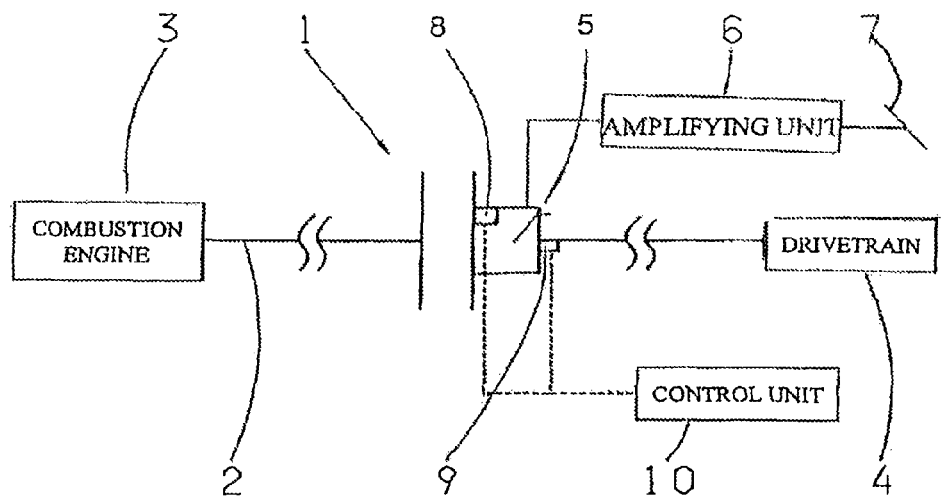
FIG. 1: Very schematic representation of a motor vehicle with a shifting clutch, in which the arrangement and method are use according to the invention.

FIG. 1 shows a schematic representation of a motor vehicle in which a shifting clutch 1 with the method and the arrangement according to the invention for determining the wear condition is provided. This clutch 1 is connected on one side to a driveshaft 2 of an internal combustion engine 3, while its other half is connected to a drivetrain 4 comprising a transmission, differential, etc. Depending on the disengaging status of the clutch 1, there is a force flow from the combustion engine 3 to the drivetrain 4 or vice-versa. To actuate the clutch 1, it is in active connection via a release bearing 5 and an amplifier unit 6 with a clutch pedal 7, by actuating which a disengaging movement of the clutch 1—not illustrated here — can be initiated. To determine the parameters of the clutch release path $S_{release}$ and the release force $F_{release}$ in the area of the release bearing 5, a force sensor 8 and a path sensor 9 are provided. These two sensors 8 and 9 are connected to a control unit 10 of the motor vehicle, in which the wear condition of the clutch 1 is determined with reference to the parameters supplied by the force sensor 8 and the path sensor 9. In accordance with an advantageous embodiment of the invention, the release force is determined by measuring a pressure of a hydraulic or pneumatic release device.

Figure 2:
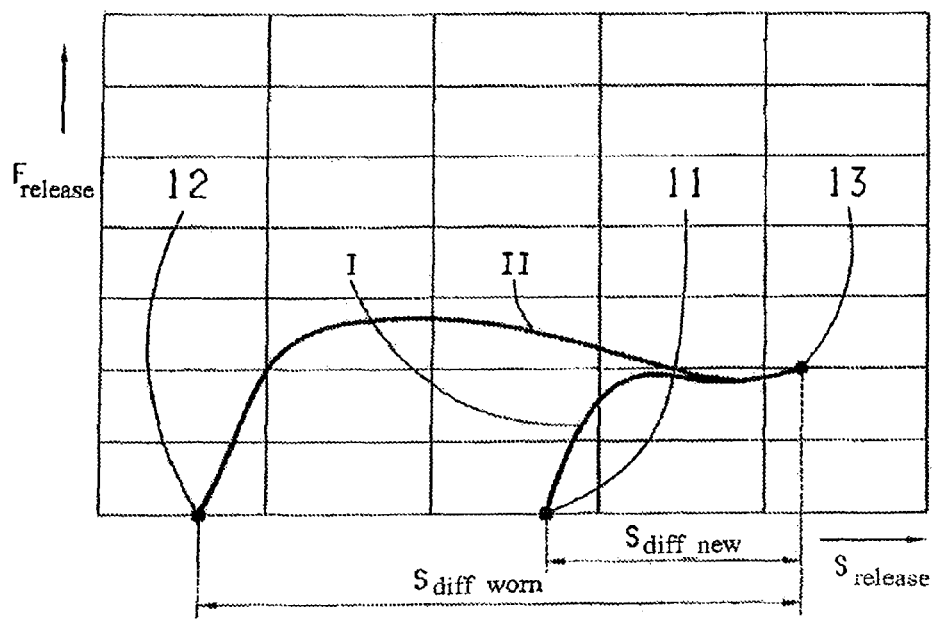
FIG. 2: Diagram showing variations I and II of a release force, in each case plotted against the release path of a shifting clutch.

FIG. 2 shows two variations I and II of the release force parameter $F_{ausrück}$ at the release bearing 5 plotted against the clutch release path parameter $s_{ausrück}$. Curve 1 shows the release force variation of a new clutch, while curve II shows the release force of an already worn clutch. Both curves I and II show a first increase of the release force $F_{ausrück}$, represented respectively by the points 11 and 12, and have a common second increase that forms the reference point 13. The wear condition of the clutch 1 is now determined in terms of the difference between the clutch release paths $s_{ausrück}$ at which the respective first increase of the release force $F_{ausrück}$ occurs, namely points 11 or 12, and the reference point 13. For curve II, typical of a severely worn clutch, the path difference $s_{diff\_ausv}$ is substantially larger than the path difference $s_{diff\_ausv}$ in curve I. In this way, therefore, i.e. by virtue of the variation of the difference as wear progresses, a conclusion can be drawn about the condition of the shifting clutch 1 at the time. Moreover, since the point corresponding to the first increase of the release force $F_{ausrück}$, namely 11 or 12, and the reference point 13 can each be freshly determined by the sensors 8 and 9 at each measurement, an absolute measurement of the wear condition of the clutch 1 can be obtained at any time. In addition, from a defined size of the difference onward the control unit 10 can issue a warning message to the vehicle's driver about the condition of the clutch 1 and thereby alert him to the problem.

Indexes
1 Shifting clutch
2 Driveshaft
3 Internal combustion engine
4 Drivetrain
5 Release bearing
6 Amplifier unit
7 Clutch pedal
8 Force sensor 9 Path sensor
10 Control unit
11 First clutch force increase of a new clutch
12 First clutch force increase of a worn clutch
13 Reference point
I Release force curve of a new clutch
II Release force curve of a worn clutch
$F_{ausrück}$ Release force at the release bearing
$S_{ausrück}$ Clutch release path at the release bearing
$S_{diff\_ausv}$ Path difference when the clutch is worn
$S_{diff\_ausn}$ Path difference when the clutch is new

The invention claimed is:

1. A method for determining a wear condition of a shifting clutch of a motor vehicle in which the clutch is provided for one of interrupting a force flow and equalizing a rotational speed between a drive output shaft of an internal combustion engine and a drivetrain of the motor vehicle, the method comprising the steps of:
   moving the clutch along a clutch release path during a single clutch actuation,
   detecting a first location of the clutch along the clutch release path where, at a start of the clutch actuation, an initial increase of a release force in a release bearing occurs,
   detecting a second location of the clutch along the clutch release path where, during the single clutch actuation, and after both the initial increase of release force and a decrease in the release force on the release bearing, a subsequent increase of the release force in the release bearing occurs,
   defining the second location as a reference point value,
   defining a distance between the first location and the second location along the release path as a path difference, and
   comparing the path difference to a first predefined limit to determine the wear condition of the clutch.

2. The method according to claim 1, further comprising the steps of:
   carrying out a measurement if at least one of no reference point value is currently stored and a defined time interval elapses, and
   storing a current reference point value.

3. The method according to claim 1, further comprising the step of determining the wear condition when the combustion engine is started and the clutch is first actuated.

4. The method according to claim 1, further comprising the step issuing a warning message to a driver of the motor vehicle when the path difference is greater than the first predefined limit.

5. The method according to claim 4, further comprising the step of issuing a warning message of moderate urgency to the driver of the motor vehicle when the path difference exceeds the first predefined limit, and issuing a warning message of greater urgency to the driver of the motor vehicle when the path difference exceeds a second predefined limit value.

6. The method according to claim 1, further comprising the step of determining the release force by at least one of a pressure sensor and a force sensor.

7. The method according to claim 1, further comprising the step of determining the release force by measuring a pressure of one of a hydraulic release device and a pneumatic release device.

8. The method according to claim 1, further comprising the step of calculating the release force.

9. An arrangement for determining a wear condition of a shifting clutch that is located in a motor vehicle for one of interrupting a force flow and equalizing a rotational speed between a drive output shaft of an internal combustion engine and a drivetrain of the motor vehicle,
   a first sensor for detecting release forces in a release bearing of the clutch, when the clutch is actuated during a single actuation, a second sensor for determining a release path of the clutch in relation the release force in the release bearing of the clutch, a control unit for defining, a first location of the clutch along the release path where, at a start of the single clutch actuation, a first initial increase of a release force in the release bearing occurs,
   the control unit defining a second location of the clutch along the release path where, during the single clutch actuation, and after both the initial increase of release force and a span of a decrease in the release force on the release bearing, a subsequent increase of the release force in the release bearing occurs,
   the control unit defining the second location as a reference point value,
   the control unit defining a distance between the first location and the second location along the release path as a path difference and determining the wear condition of the clutch by comparing the path difference to a first predefined limit, and
   the sensor for detecting release forces, in an area of the release bearing of the clutch, is connected to the control unit for evaluating a parameter determined by the sensor.

10. The arrangement according to claim 9, wherein the control unit is connected to the sensor that detects the release forces in the release bearing, and the other sensor for determining the release path of the clutch is connected to the control unit and is arranged on the drivetrain downstream from the release bearing.

11. A method of determining an absolute value of wear of a shifting clutch of a motor vehicle, in which the clutch is provided for one of interrupting a flow of force and equalizing a rotation speed between a drive output shaft of an internal combustion engine and a drivetrain of the motor vehicle, the method comprising the steps of:
   monitoring, via a force sensor, a release force at a release bearing of the clutch;
   monitoring a clutch release path of the clutch as the clutch is released;
   measuring a difference in the clutch release path between a first location of the clutch when, at the initiation of disengagement, an initial increase in the release force on the release bearing is detected, and a second location of the clutch when, during the same disengagement, and after both the initial increase of release force and a span of a decrease in the release force on the release bearing, a subsequent increase of the release force in the release bearing occurs, and
   determining the wear of the clutch from a difference between the first location and the second location of the clutch compared to a predefined limit of difference.

* * * * *